United States Patent [19]

Mueller

[11] Patent Number: 4,635,812
[45] Date of Patent: Jan. 13, 1987

[54] APPARATUS FOR HEATING PASTA AND SAUCE

[76] Inventor: Martin Mueller, 2545 Lake Shore Dr., Wonder Lake, Ill. 60097

[21] Appl. No.: 747,321

[22] Filed: Jun. 21, 1985

[51] Int. Cl.⁴ .............................................. B65D 8/04
[52] U.S. Cl. ....................................... 220/70; 99/330; 99/403; 99/410; 99/426; 126/20; 126/369; 426/510
[58] Field of Search ................. 99/359, 371, 467, 403, 99/410, 426, 450, 474, 330; 220/66, 70; 126/20, 20.1, 20.2, 369; 426/509, 510, 511

[56] References Cited

U.S. PATENT DOCUMENTS

| | | |
|---|---|---|
| 1,955,289 | 4/1934 | Greenfield . |
| 2,011,247 | 8/1935 | Jourdan . |
| 2,100,039 | 11/1937 | Standley . |
| 2,967,773 | 1/1961 | Anderson . |
| 3,071,473 | 1/1963 | Churley . |
| 3,248,221 | 4/1966 | Shulz et al. . |
| 3,294,548 | 12/1966 | Vischer, Jr. . |
| 3,316,829 | 5/1967 | Foldenauer . |
| 3,333,966 | 8/1967 | Willard . |
| 3,425,339 | 2/1969 | Fleischman .................... 426/511 X |
| 3,603,240 | 9/1971 | McCarthy ......................... 99/359 X |
| 3,927,976 | 12/1975 | Reimers et al. . |
| 3,934,497 | 1/1976 | Hannah . |
| 3,958,503 | 5/1976 | Moore ............................... 99/450 X |
| 4,011,805 | 3/1977 | Vegh et al. . |
| 4,137,337 | 1/1979 | Löhr et al. . |
| 4,185,125 | 1/1980 | Sakakibara ........................ 99/403 X |
| 4,214,514 | 7/1980 | Contino .................................. 99/330 |
| 4,233,891 | 11/1980 | Schindler et al. . |
| 4,262,026 | 4/1981 | Korkmaz . |
| 4,452,132 | 6/1984 | Miller .............................. 126/369 X |
| 4,569,277 | 2/1986 | Stiglich ................................. 99/330 |

FOREIGN PATENT DOCUMENTS

| | | | |
|---|---|---|---|
| 0094066 | 5/1985 | Japan ..................................... 99/410 |
| 79307 | 11/1951 | Norway ............................... 220/70 |

Primary Examiner—Billy J. Wilhite
Attorney, Agent, or Firm—Mathew R. P. Perrone, Jr.

[57] ABSTRACT

A method and apparatus for heating food quickly and efficiently include a modified, steam-heating apparatus having a special cup holder with a suitable cup for use with the holder. This cup suitable for use with a cup holder is used to steam heat pasta, sauces and other foods, to thereby bring the foods up to eating temperature very quickly. This cup is designed to be temporarily secured to the steamer by a spring loaded, firm holding device which permits the steam to be injected at the edge of the cup.

19 Claims, 5 Drawing Figures

U.S. Patent   Jan. 13, 1987   Sheet 1 of 2   4,635,812
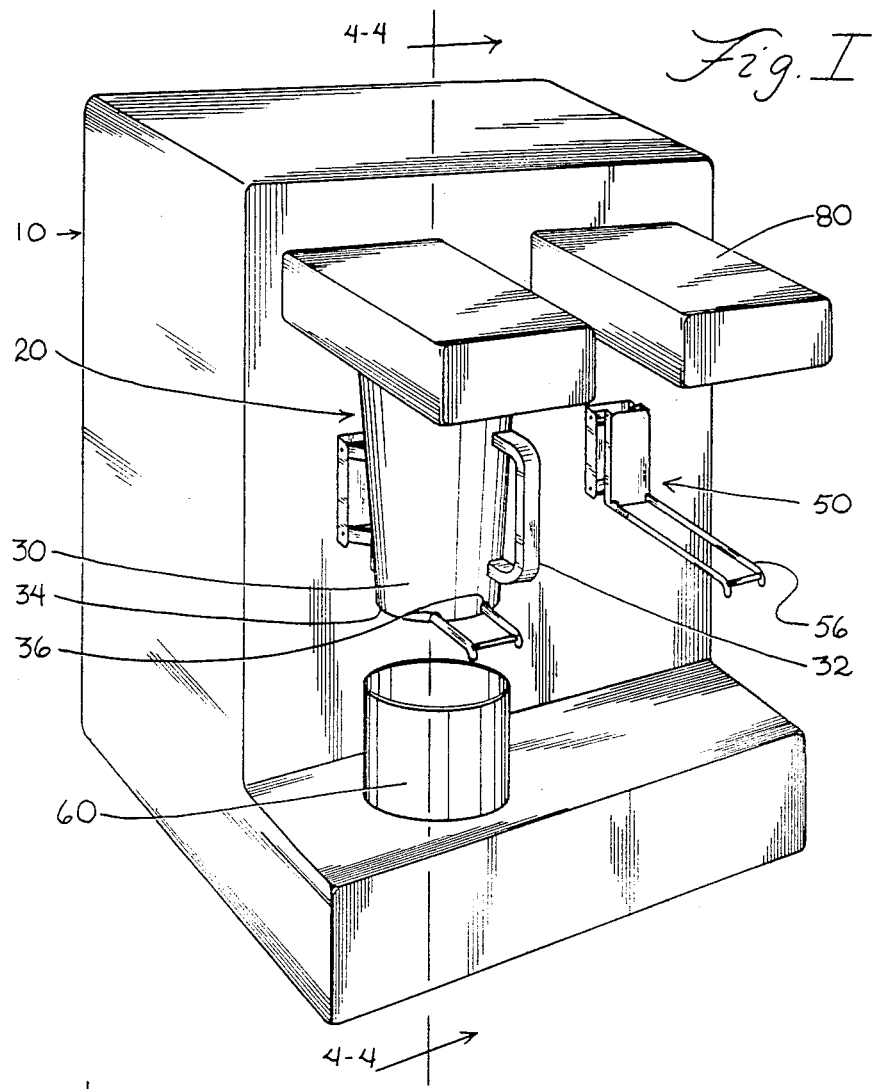
Fig. I
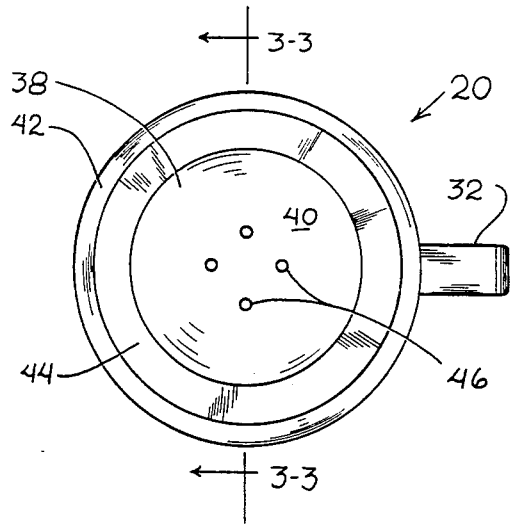
Fig. II
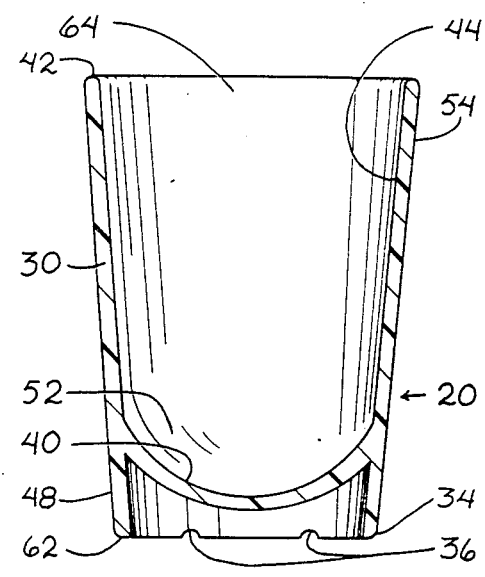
Fig. III

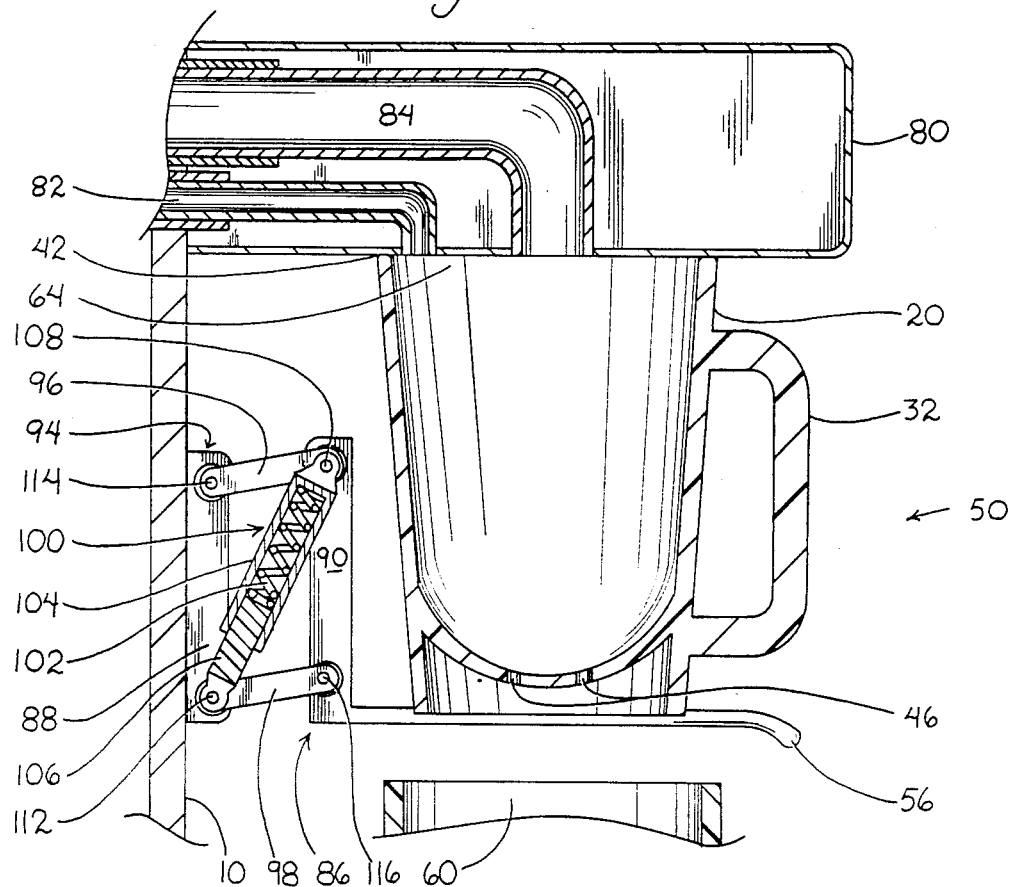
Fig. IV
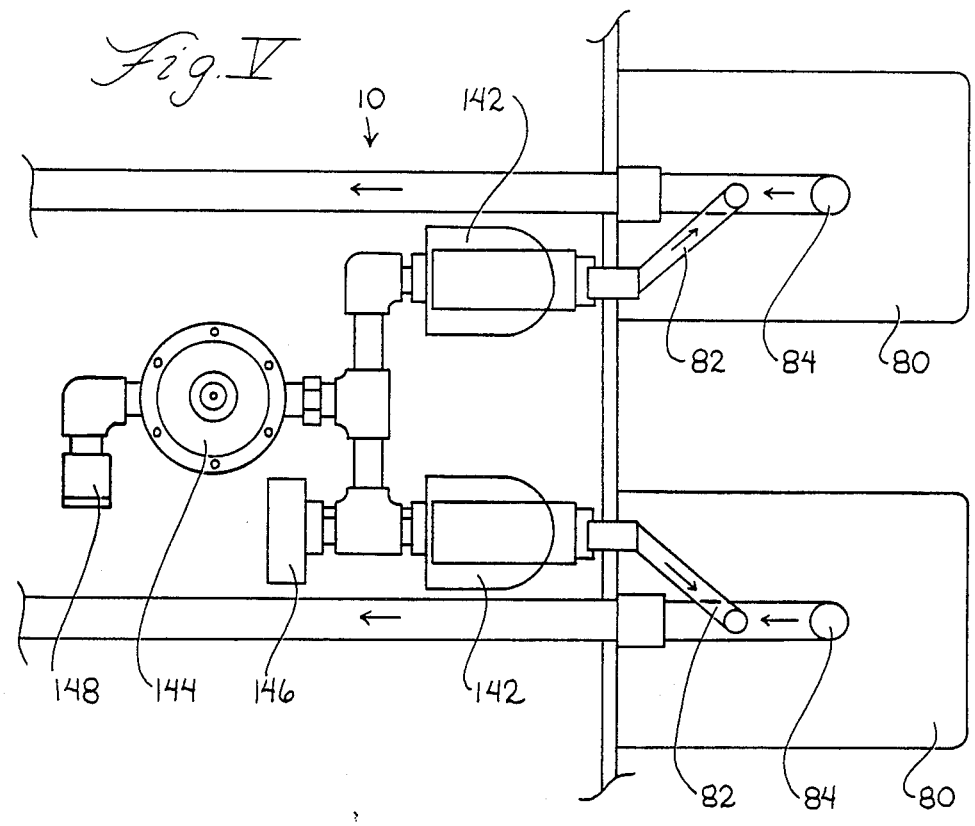
Fig. V 4,635,812

APPARATUS FOR HEATING PASTA AND SAUCE

BACKGROUND OF THE INVENTION

This invention relates to an apparatus for heating food; and, more particularly, to an apparatus for controlled, quick and steam heating of pasta and sauce.

In the food industries, and especially restaurant industries, it is highly desirable to be able to heat a liquid, a solid food, or mixtures thereof quickly, while maintaining desirable eating characteristics. This combination of heating quickly and maintaining taste tends to be counter-productive. If the food is prepared in advance so that it can be heated quickly, some taste is lost during storage and reheating. By the same token, if the food is not prepared substantially in advance, quick and efficient reheating cannot occur. This is especially true in the case of pasta and sauce dishes. In pasta and sauce dishes, the heating must be done quickly and efficiently in order to achieve quick service. Yet such quick heating can destroy the desired flavor of such foods. It is highly desirable to find a method for quickly heating the foods while maintaining the flavor.

It is well known in the art that such foods can be reheated. The apparatus used for reheating such foods generally requires direct contact with the food, the apparatus becomes contaminated with the food, so that substantial cleaning is required after use to maintain the desired sanitary conditions. This cleaning is time consuming and difficult. It clearly takes time or achieve the desired cleanliness factors in order to thereby provide the required sanitary conditions for service. If the process and apparatus can be developed that can provide for energy efficient and cost efficient heating of the food in such a direct fashion without direct contact with the food by the apparatus, great advantages are obtained—from the reduced cleaning time, let alone the other substantial savings.

It is clear in the prior art that such direct contact of the food by the heating apparatus is required so that the food may be completely and thoroughly heated by the apparatus. Without such direct contact, complete and thorough heating of the food is impossible according to the prior art.

Even when methods and apparatus of quickly heating food are developed, such apparatus prove to be clumsy and difficult to handle. It is very important to provide an apparatus for heating which can be easily loaded with the food to be heated and have the resultant heated food removed therefrom in a simple fashion. Such apparatus does not exist in the prior art at the time.

Thus is can be seen that it is highly important to provide a quick efficient method for heating foods with an apparatus which can be easily cleaned.

SUMMARY OF THE INVENTION

Therefore, and object of this invention is to provide a method for heating food uniformly.

A further object of this invention is to provide an apparatus for heating food without contact of the food by the apparatus.

A still further object of this invention is to provide an apparatus for heating food uniformly.

Yet a further object of this invention is to provide a method for heating without direct contact of the food by the heating apparatus.

Also an object of this invention is to provide an apparatus for heating food quickly.

Another object of this invention is to provide a method for heating food quickly without direct contact of the food.

These and other objects of the invention are met by providing a cup having a container portion with rounded bottom for holding food with a support flang extending beyond the rounded bottom and capable of being spring loaded into a steaming device which permits the steam to be sprayed into the cup at the edge of the cup and circulated by the rounded bottom of the cup.

BRIEF DESCRIPTION OF THE DRAWING

FIG. I is a perspective view of the steam apparatus 10 of this invention showing cup 20 and cup holder 50 of this invention.

FIG. II is a top cup view 22 of cup 20 showing pasta steaming apertures 46 in the bottom thereof.

FIG. III is a cross-section of cup 20 along Lines 3—3 showing a smooth arcuate bottom.

FIG. IV is a partial cross-section of cup holder 50 taken along Line 4—4 of FIG. I.

FIG. V is a top view of steam apparatus 10 modified by a partial cut away view to show steam flow.

Throughout the figures of the drawing, where the same part appears in more than one figure, the same number is assigned thereto.

DESCRIPTION OF THE PREFERRED EMBODIMENTS

A method and apparatus for heating food quickly and efficiently include a modified, steam-heating apparatus having a special cup holder with a suitable cup for use with the holder. This cup suitable for use with a cup holder is used to steam heat pasta, sauces and other foods, to thereby bring the foods up to eating temperature very quickly. This cup is temporarily secured to the steamer (steam-heating apparatus) by a spring loaded, firm holding device which permits the steam to be injected at the edge of the cup. The structure of the cup by having a concave bottom on the interior of the cup combined with steam injection at the edge of the cup permits the food to be heated evenly. Basically the food containing portion of the cup is in the form of a three-dimensional parabola.

Referring now to FIG. I, steamer 10 is shown in perspective with cup 20 on one of two cup holders 50. Cup 20 includes a cup body 30 with a handle 32 secured thereto. Cup body 30 includes a cup base 34 supported on holder rods 56. Holder notches 36 in cup base 34 receive holder rods 56 and permit cup 20 to be tightly held adjacent steam circulation housing 80. This tight holding provides for efficient steaming of the food in cup 20.

In FIG. II a top view of cup 20 is depicted. The particular form of cup 20 shown in FIG. II is suitable for steaming pasta and other foods which are not liquid in nature. Cup 20 includes a pasta bottom 38. Pasta bottom 38 is a concave bottom 40 of cup 20. Cup edge 42 at the top of cup 20 is tapered down cup interior 44 to a parabolic concave bottom 40. Within concave bottom 40 are pasta steaming apertures 46. This particular cup 20 including the pasta steaming apertures 46 permits steam to flow into cup 20 and the condensation from the steam to flow out through pasta steaming apertures 46 into a container 60 set below cup 20. In this manner, the pasta can be heated and drained in one, efficient step.

FIG. III shows a cross section of cup 20 taken on Line 3—3 of FIG. II with a sauce bottom 52. Sauce bottom 52 is substantially similar to pasta bottom 38 but for the absence of pasta apertures 46. Cup 20 cooperates with steamer 10.

In this fashion, holder notches 36 in the cup base 34 are particularly shown so that they might cooperate with holder rods 56. As can be seen, cup exterior 54 has a base flange 48 below parabolic concave bottom 40. Base flange 48 forms the cup base 62 at the bottom 34 of cup 20. Holder notches 36 are included in cup base 62 as two pair of parallel semicircular notches therein.

Steamer 10 is described by references to FIG. IV and FIG. V. FIG. IV depicts a partial cross section of steamer 10. Steamer 10 is a standard steamer known in the art. Cup holder 50 is added to steamer 10 as a part of this invention. With the partial cross-section showing cup holder 50 and cup 20, the cooperation therebetween becomes clear. Cup holder 50 is designed to hold cup 20 adjacent steam inlet 82 so that steam inlet 82 feeds into the top 64 of cup 20. Steam inlet 82 is adjacent the edge 42 of cup 20.

Steam circulation housing 80 includes steam inlet 82 and steam receiver 84. In this fashion, steam flows from steam inlet 82 and circulates uniformly through the food therein due to the concave bottom 40 to provide throughout the entire contents of cup 20. Cup 20 in this particular figure includes pasta apertures 46 in the bottom of cup 20. The steam, that is condensed, drains out of cup 20 through pasta apertures 46 into container 60. The steam, that is not condensed, is returned to the steamer 10 by steam receiver 84, which is a larger pipe centrally located over top 64 of cup 20.

Rod assembly 86 of cup holder 50 includes holder rods 56 secured to steam assembly 88 on steamer 10. Holder rods 56 are secured to rod support 90 by welding, molding or other suitable fashion to form rod assembly 86. Rod assembly holder 94 is secured to steamer 10 at steam assembly 88.

The rod assembly holder 94 includes an upper support brace 96 and a lower support brace 98. Upper support brace 96 and lower support brace 98 combine with steam assembly 88 and rod support 90 to form a quadrilateral. Diagonally across the quadrilateral thus formed is spring shock 100. Spring shock 100 includes spring 102 in spring receiver 104. Spring receiver 104 is in a female/male relationship with spring support 106. Spring receiver 104 is movably secured to upper support brace 96 and rod support 90 at first pin holder 108. Spring support 106 is movably secured to steam assembly 88 and lower support brace 98 at second pin holder 112. Third pin holder 114 secures upper support brace 96 to steam assembly 88 at an upper portion thereof. Fourth pin holder 116 secures lower support base 98 to rod asssembly 86 at a lower portion thereof. In this fashion, steam assembly 88 and rod support 90 can move relative to each other and hold cup 20 in position on rods 56 in a spring loaded fashion.

Referring now to FIG. V, steamer 10 is shown as feeding steam through steam circulation housing 80 by means of steam inlet 82. Steam circulation housing 80 modifies a standard version of steamer 10 used in conjunction with cup 20 and cup holder 50 for the purpose of quickly steaming food.

Referring again to FIG. V, steam control 142 feeds steam into steam inlet 82 to heat the food. Steam control 142 is fed by heating implement 144 which heats the water to form the steam. Steam valve 146 controls the amount of steam entering the steam control 142 and thence into steam inlet 82. Pipe 148 feeds water into the steam heating implement 144. The steam circulates through the cup 20 (shown in FIG. IV) through steam inlet 82. Excess steam flows out through steam outlet 84 and is recycled (the recycling system is not shown) for the purpose of simplifying the heating process of the apparatus. Steam control 142, heating implement 144, steam valve 146 and pipe 148 are common elements of a steamer, such as steamer 10 and need no further explanation.

In operation, cup 20 has food desired to be heated placed therein. The food may be solid, liquid, or mixtures thereof. The solid food may use cup 20 with pasta apertures 46 therein. Liquid or partially liquid foods require cup 20 without pasta apertures 46. Holder notches 36 are used to contact holder rods 56. Holder rods 56 are pushed downwardly by cup 20 due to the action of spring shock 100. Cup 20 is then inserted between holder rods 56 and steam circulation housing, so that steam inlet 82 is adjacent edge 42 of cup 20. Spring shock 100 raises holder rods 56 to hold cup 20 adjacent steam inlet 82 and steam receiver 84. Steam is then injected from steamer 10 through steam inlet 82, so that the desired food may be heated as swiftly and efficiently as possible.

Because of the disclosure herein and solely because of the disclosure herein, certain modifications hereof can become apparent to those having ordinary skill in this art. Such modifications are clearly covered hereby.

What is claimed and sought to be secured by Letters Patent of the United States is:

1. An apparatus for heating food wherein direct food contact by said apparatus is avoided, said apparatus comprising a steaming apparatus, at least one cup holder secured to said steaming apparatus as an integral part of said steaming apparatus, and a cup to cooperate with said cup holder, wherein:
    a. said steaming apparatus includes a steam circulation housing;
    b. said cup holder includes holder rods for holding said cup on said apparatus;
    c. said cup includes a cup body;
    d. a handle is secured to said cup body;
    e. said cup body includes a cup base;
    f. said cup base includes holder notches to receive said holder rods and permit said cup to be tightly held adjacent to a steam circulation housing to provide for efficient steaming of food placed in said cup; and
    g. said cup has an interior shape, for holding said food, of a parabolic concave cup bottom.

2. The apparatus of claim 1 wherein:
    a. said cup bottom
    b. includes pasta steaming apertures; and
    b. said pasta steaming apertures permit steam to flow into said cup and condensation from said steam to flow out through said pasta steaming apertures to thereby permit a solid food to be heated and drained substantially simultaneously.

3. The apparatus of claim 1 wherein:
    a. said interior shape is surrounded by a cup exterior as a unitary part thereof;
    b. said interior shape is surrounded by a cup exterior as a unitary part thereof;

c. said cup exterior includes a base flange extending below said parabolic concave bottom; and d. said base flange includes, at a flange bottom, holder notches to cooperate with said holder rods.

4. The apparatus of claim 3 wherein said holder notches are two pair of parallel semicircular notches in said flange bottom.

5. The apparatus of claim 1 wherein:

a. said cup holder includes a steam circulation housing to cover a top of said cup, and a rod assembly;

b. said steam circulation housing includes steam inlet for feeding steam into said cup and steam receiver for recirculating uncondensed steam;

c. said rod assembly includes said holder rods being secured to said to said rod support; and d. said rod assembly includes a bracing assembly for supporting said cup on said holder rods adjacent to said steam circulation housing.

6. The apparatus of claim 5 wherein said steam circulation housing includes a steam inlet to feed steam into a top of said cup adjacent an edge of said cup, and a steam receiver positioned centrally over said top of said cup.

7. The apparatus of claim 6 wherein:

a. said rod assembly is secured to a steam assembly on said steamer; and b. said rod assembly includes a rod support movably secured to said steam assembly.

8. The apparatus of claim 7 wherein:

a. said rod assembly holder includes an upper support brace oppositely disposed from a lower support brace;

b. said upper support brace and said and said lower support brace are movable with respect said steam assembly and said rod support to form a quadrilateral and permit said cup to be removably secured on said holder rods between said holder rods and said steam circulation housing;

c. said upper support brace and said and said lower support brace combine with said steam assembly and said rod support to form a quadrilateral; and d. a spring shock assembly is movably secured diagonally across said quadrilateral to provide for receiving of said cup between said holder rods and said steam circulation housing.

9. The apparatus of claim 8 wherein:

a. said interior shape is surrounded by a cup exterior as a unitary part thereof;

b. said cup exterior includes a base flange extending below said parabolic concave bottom; and c. said base flange includes, at a flange bottom, holder notches to cooperate with said holder rods.

10. The apparatus of claim 9 wherein:

a. said cup includes a pasta bottom;

b. said pasta bottom includes, within said concave bottom, pasta steaming apertures; and c. said pasta steaming apertures permit steam to flow into said cup and condensation from said steam to flow out through said pasta steaming apertures to thereby permit a solid food to be heated and drained substantially simultaneously.

11. The apparatus of claim 9 wherein said concave cup bottom receives said food in at least a partially fluid state.

12. A method for heating food wherein direct food contact by a heating apparatus is avoided wherein said method includes:

a. placing said food into a cup wherein:

1. said cup includes a cup body;

2. a handle is secured to said cup body;

3. said cup body includes a cup base;

4. said cup base includes holder notches to receive holder rods and permit said cup to be tightly held adjacent to a steam circulation housing to provide for efficient steaming of food placed in said cup; and 5. said cup has an interior shape for holding said food of a parabolic concave cup bottom; and b. temporarily mounting said cup in a cup holder secured to a steaming apparatus, wherein;

1. said cup holder includes a steam circulation housing to cover a top of said cup, and a rod assembly;

2. said steam circulation housing includes steam inlet for feeding steam into said cup and steam receiver for recirculating uncondensed steam;

3. said rod assembly includes said holder rods being secured to said rod support; and 4. said rod assembly includes a bracing assembly for supporting said cup on said holder rods adjacent to said steam circulation housing.

13. The method of claim 12 wherein said method further includes feeding steam into a top of said cup adjacent an edge of said cup.

14. A cup for use with a steaming apparatus to permit rapid heating of food while avoiding contact with said food by said steaming apparatus, said cup having a structure wherein:

a. said cup includes a cup body;

b. a handle is secured to said cup body;

c. said cup body includes a cup base;

d. said cup base includes holder notches to receive holder rods and permit said cup to be tightly held adjacent to a steam circulation housing to provide for efficient steaming of food placed in said cup; and e. said cup has an interior shape for holding said food of a parabolic concave cup bottom.

15. The cup of claim 14 wherein:

a. said cup has a concave bottom and includes a pasta bottom;

b. said pasta bottom includes, within said concave bottom, pasta steaming apertures; and c. said pasta steaming apertures permit steam to flow into said cup and condensation from said steam to flow out through said pasta steaming apertures to thereby permit a solid food to be heated and drained substantially simultaneously.

16. The cup of claim 14 wherein said cup has a solid, concave bottom suitable for holding partially liquid food.

17. The cup of claim 14 wherein:

a. an interior shape of said cup is surrounded by a cup exterior as a unitary part thereof;

b. said cup exterior includes a base flange extending below said parabolic concave bottom; and c. said base flange includes, at a flange bottom, holder notches to cooperate with said holder rods.

18. The apparatus of claim 17 wherein said holder notches are two pair of parallel semicircular notches in said flange bottom.

19. The cup of claim 18 wherein:

a. said cup includes a pasta bottom;

b. said pasta bottom includes, within said concave bottom, pasta steaming apertures; and c. said pasta steaming apertures permit steam to flow into said cup and condensation from said steam to flow out through said pasta steaming apertures to thereby permit a solid food to be heated and drained substantially simultaneously.

* * * * *